(12) United States Patent
Ryu et al.

(10) Patent No.: US 9,392,098 B2
(45) Date of Patent: Jul. 12, 2016

(54) DUMMY TERMINAL AND MAIN BODY (71) Applicants: Seung Woo Ryu, Gyeongi-Do (KR); Kwang Hyun Lee, Seoul (KR)

(72) Inventors: Seung Woo Ryu, Gyeongi-Do (KR); Kwang Hyun Lee, Seoul (KR)

( * ) Notice: Subject to any disclaimer, the term of this patent is extended or adjusted under 35 U.S.C. 154(b) by 0 days.

(21) Appl. No.: 14/584,218

(22) Filed: Dec. 29, 2014

(65) Prior Publication Data
US 2015/0189061 A1 Jul. 2, 2015

(30) Foreign Application Priority Data

Dec. 30, 2013 (KR) .................. 10-2013-0166572

(51) Int. Cl.
*H04W 52/00* (2009.01)
*H04M 1/725* (2006.01)
*H04W 52/02* (2009.01)
*H04W 12/06* (2009.01)
*H04W 4/00* (2009.01)

(52) U.S. Cl.
CPC ............ *H04M 1/7253* (2013.01); *H04W 4/008* (2013.01); *H04W 12/06* (2013.01); *H04W 52/0229* (2013.01)

(58) Field of Classification Search
None
See application file for complete search history.

(56) References Cited

U.S. PATENT DOCUMENTS

| | | | |
|---|---|---|---|
| 2006/0154642 A1* | 7/2006 | Scannell, Jr. | A01G 9/02 455/404.1 |
| 2007/0043574 A1* | 2/2007 | Coffman | G06F 17/30899 704/275 |
| 2009/0313026 A1* | 12/2009 | Coffman | G06F 17/30899 704/275 |
| 2013/0347018 A1* | 12/2013 | Limp | H04N 21/4826 725/19 |
| 2015/0139483 A1* | 5/2015 | Shen | H05B 37/0272 382/103 |
| 2015/0177834 A1* | 6/2015 | Karakotsios | G06F 3/013 345/156 |

* cited by examiner

*Primary Examiner* — Diane Mizrahi
(74) *Attorney, Agent, or Firm* — Polsinelli PC (57) ABSTRACT

Provided are a dummy terminal and a main body using wireless communication. The dummy terminal obtains speech information from a user, receives at least one of video information and audio information from the main body through short-distance wireless communication, transmits the obtained speech information to the main body, and changes at least one of the received video information and audio information to output the changed information through a display unit and/or a speaker unit.

20 Claims, 6 Drawing Sheets

DUMMY TERMINAL AND MAIN BODY

CROSS-REFERENCE TO RELATED APPLICATIONS

This application claims priority under 35 U.S.C. §119 to Korean Patent Application No. 10-2013-0166572, filed on Dec. 30, 2013, the disclosure of which is incorporated herein by reference in its entirety.

TECHNICAL FIELD

The present invention relates to a smart apparatus, and more particularly, to a dummy terminal and a smart apparatus including a main body.

BACKGROUND

Recently, as a smartphone penetration rate increases rapidly, smartphones has become the necessities of life of modern people. The smartphones provide various data transmission services and various additional services in addition to a unique voice call service, and thus act as multimedia communication equipment in function.

Particularly, the smartphones provide various services along with wireless communication and a smartphone application.

As the kind and number of services providable by the smartphones increase, user interface (UI) technology for controlling the smartphones is being continuously developed, and an inter-apparatus cooperation service is also attracting much attention.

For example, mirroring technology has been developed and is being used in which various data, which are displayed on a screen of an apparatus that reproduces multimedia data, such as a video or a voice, are displayed in a video apparatus such as a television (TV) or a navigation apparatus through a communication connection with a smartphone, a notebook computer, a video player, a TV, or an in-vehicle navigation apparatus, thereby increasing a user's convenience.

However, apparatuses that cooperate with each other in a mirroring scheme independently have full-function and are connected to each other. For this reason, excessive hardware resources are provided in connected configuration as a whole, and the price of each apparatus is high. That is, since the redundancy of resources is high in regard to the cost for a connection between apparatuses, efficiency for use is very low.

Moreover, multimedia terminals such as smartphones are expensive because of having a complicated function, and for this reason, when a multimedia terminal is lost or broken down, an economic cost burden for repurchase or repair is large.

SUMMARY

Accordingly, the present invention provides a portable terminal in which a main body that performs basic functions such as communication, reproduction of contents, and storing of information is detached from a dummy terminal that includes a display, a speaker, and a microphone which provide UI, and thus, resource efficiency of an information technology (IT) apparatus such as a smartphone or the like increases, and the cost expended in user's using the portable terminal is reduced.

The present invention also provides a portable terminal in which a dummy terminal is able to operate only after authentication between a main body, and thus, a function is performed only when both the main body and the dummy terminal cooperate, thereby reducing a possibility of being stolen.

In one general aspect, a portable terminal includes a dummy terminal for UI and a main body for a basic function. The dummy terminal includes: a microphone unit configured to obtain speech information from a user; a communication unit configured to receive at least one of video information and audio information from the main body through short-distance wireless communication and transmit the obtained speech information to the main body; a display unit configured to output the received video information; a speaker unit configured to output the received audio information; and a control unit configured to control authentication and connection establishment with the main body and output at least one of the received video information and audio information through the display unit and/or the speaker unit.

In another general aspect, a main body includes: a communication unit configured to transmit at least one of video information and audio information to a dummy terminal through short-distance wireless communication and receive speech information and specification information of at least one of a display unit and a speaker unit from the dummy terminal; and a control unit configured to change at least one of video information and audio information, based on the received specification information and transmit at least one of the changed video information and the changed audio information Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
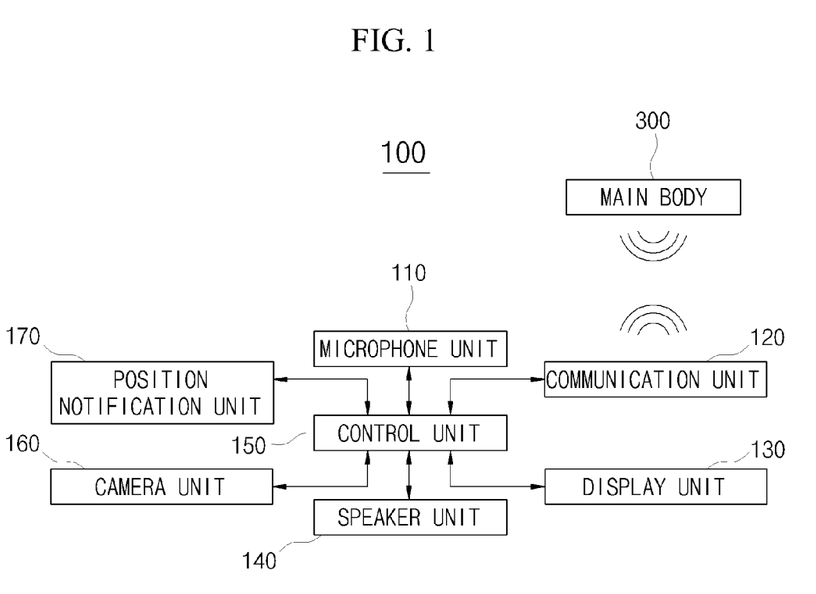
FIG. 1 is a block diagram of a dummy terminal according to an embodiment of the present invention.

FIG. 1 is a block diagram of a dummy terminal according to an embodiment of the present invention. A main body 300 and a dummy terminal cooperate with each other. The main body 300 performs a portable terminal function except a UI function, and the dummy terminal performs the UI function.

As illustrated in FIG. 1, the dummy terminal 100 using wireless communication includes a microphone unit 110, a communication unit 120, a display unit 130, a speaker unit 140, a control unit 150, a camera unit 160, and a position notification unit 170.

The microphone unit 110 obtains speech information from a user. For example, when the user performs a voice call or a video call, the microphone unit 110 obtains the speech information including details which the user has spoken.

The communication unit 120 transmits, to the main body 300, the speech information obtained from the microphone unit 110, user input information input through the display unit 130, and/or image information obtained through the camera unit 160, and receives at least one of video information and audio information from the main body 300 through short-distance wireless communication. The short-distance wireless communication denotes communication, such as Zig-Bee, Bluetooth, infrared communication, optical communication, wireless LAN, or radio frequency (RF), within a range of several m to several tens m.

The video/audio information received from the main body 300 includes image information for UI which includes video/audio information that is generated by reproducing a video/audio stream or a file received by the main body 300 from the outside or stored in the main body 300, audio information including a voice of the other party in a voice call, audio information and video information including a voice and an image which are transferred from a terminal of the other party over a mobile communication network in a video call, icons, widgets, and a keypad.

The display unit 130 displays video information received from the main body 300.

The speaker unit 140 receives audio information from the main body 300, and outputs the audio information.

Figure 2:
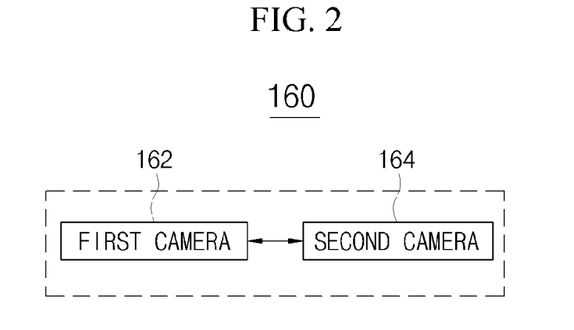
FIG. 2 is a block diagram illustrating a camera unit according to an embodiment of the present invention.

The camera unit 160 photographs the front and/or rear of the dummy terminal 100. As illustrated in FIG. 2, the camera unit 160 includes a first camera 162 and a second camera 164, and may photograph the front and rear of the display unit 130 of the dummy terminal 100.

The control unit 150 controls operations of the microphone unit 110, the communication unit 120, the display unit 130, the speaker unit 140, and the camera unit 160 in order for the dummy terminal 100 to appropriately perform the UI function.

The control unit 150 transfers audio/video information obtained by the microphone unit 110 and the camera unit 160 to the main body 300, and transfers audio/video information received from the main body 300 to the display unit 130 and the speaker unit 140.

Furthermore, the control unit 150 may transmit specification information (for example, a resolution information, etc.) of at least one of the display unit 130 and the speaker unit 140 to the main body 300 through the communication unit 120. Then the main body 300 adjusts a resolution and/or a screen size according to the specification of the display unit 130 of the dummy terminal 100 and reproduces audio information according to the specification of the speaker unit 140 of the dummy terminal 100, and transmits the video/audio information to the control unit 150.

Control unit 150 receives the video information and/or the audio information and output the video information and/or the audio information to the display unit 130 and/or the speaker unit 140.

For example, supposed original contents in the main body 300 includes video information which is avi format, 1920×1040, and 30 fps, and audio information which is Dolby AC3 format, 6 ch, 48000 Hz, 384 kbps, and 1 audio. And if the dummy terminal 100 transmits its own specification information of the display unit 130 of the dummy terminal 100 which is 480×272, 24 fps, and 600 kbps, and the specification of the speaker unit 140 which is 2 ch, 44100 Hz, 96 kbps, and 1 audio to the main body 300, the main body 300 decodes the video/audio information, converts a resolution, etc. of the video/audio information according to the specification information from the dummy terminal 100 depending on the case, and transmits the video/audio information to the dummy terminal 100. Then the control unit outputs the received video/audio information to the display unit 130 and/or the speaker unit 140.

Therefore, in the present embodiment, the main body 300 generates and transmits a video signal and/or an audio signal optimized for the dummy terminal 300, and thus, the dummy terminal 300 outputs video and/or audio information, based on specification information optimized for the dummy terminal 300.

Also, the control unit 150 controls an operation mode of the dummy terminal 100.

When a short-distance wireless communication speed with the main body 300 is lowered to a predetermined threshold value (for example, less than 1 Mbps in transmitting a video, and less than 300 kbps in transmitting an audio), the control unit 150 switches the dummy terminal 100 to a monitoring mode.

The monitoring mode denotes a state in which only the communication unit 120 and the control unit 120 are activated. The short-distance wireless communication speed may be measured by the main body 300 and transferred to the dummy terminal 100, and the dummy terminal 100 may autonomously measure the short-distance wireless communication speed.

When the monitoring mode is entered, the control unit 150 monitors through the communication unit 120 whether a wireless communication connection is made, and then when the wireless communication seeped higher than the predetermined threshold value, the control unit switches the monitoring mode to an active mode to activate the display unit 130.

Therefore, in a slow transmission speed difficult to normally output a video or an audio, by switching a mode to the monitoring mode, power consumption can be reduced and a user can immediately recognize that a communication state between the dummy terminal 100 and the main body 300 is not good.

When a communication connection with the main body 300 is fully disconnected, or data is not exchanged with the main body 300 for a long time, the control unit 150 enters the dummy terminal 100 into a sleep mode.

The sleep mode is a mode in which all functions of the control unit 150 or only a user input function of the control unit 150 are/is activated, and thus, it is only possible to receive a basic user input such as a home button being pushed.

When the home button is pushed in the sleep mode, the display unit 130 is activated and displays a screen for code input, and when an appropriate code is input, the communication unit 120 is activated, checks whether the main body is disposed near the communication unit 120, and establishes a communication connection with the main body 300. When a connection with the main body 300 is established, the dummy terminal 100 is fully activated, transmits or receives video/audio/control information to or from the main body 100, and enters the active mode in which the portable terminal provide full function to the user.

That is, in a case where the sleep mode is entered, when an accurate code is not input and a connection with the main body 300 is not established, the dummy terminal 100 is not fully activated. Therefore, even in a case where the dummy terminal 100 is stolen or lost, it is unable to use the dummy terminal 100, thereby fundamentally decreasing a possibility of being stolen.

—Position Notification Unit—

Figure 3:
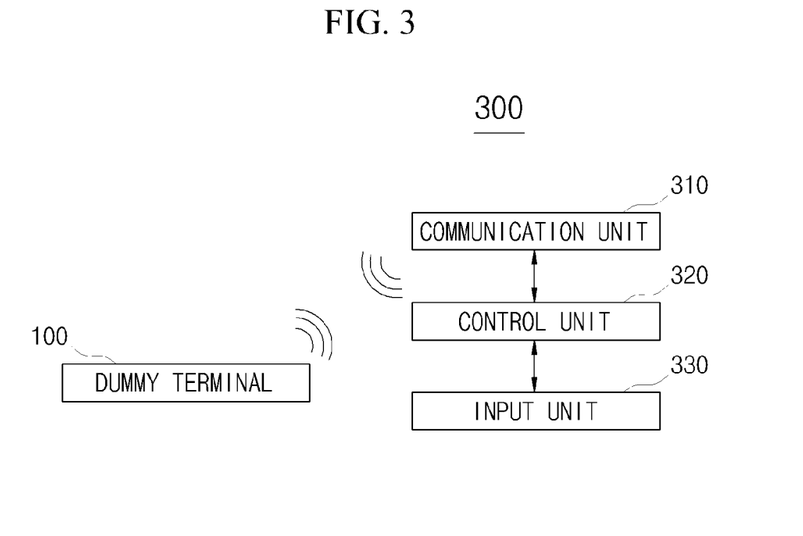
FIG. 3 is a block diagram of a main body according to an embodiment of the present invention.

The user can forget an accurate position of the dummy terminal 100 while using the dummy terminal 100. At this time, when the user inputs a trace command through an input unit 330 of the main body 300, the main body 300 transmits a trace signal in response to the trace command, and when the dummy terminal 100 receives and responds to the transmitted trace signal, the user can easily find the dummy terminal 100.

In detail, when the dummy terminal 100 receives the trace signal from the main body 300 through the communication unit 120, a position notification unit 170 performs at least one of vibration, generation of a signal sound, and flickering in response to the trace signal.

The position notification unit 170 may be configured with a separate hardware (H/W) or software (S/W) module independently from the control unit 150, and the control unit 150 may perform a function of the position notification unit 170.

Although not shown, the dummy terminal 100 may further include a memory that temporarily stores video/audio information, or stores specification information and/or information for authentication.

The dummy terminal 100 may be configured to have an external appearance such as a general smartphone. In this case, the user may use the dummy terminal 100 in the same manipulation scheme as that of the general smartphone with the user's having the same feeling.

However, since the dummy terminal 100 has only the UI function, power consumption is very small, and hardware complexity is far lower than that of terminals such as smartphones. Therefore, it is very easy to lighten and thin an apparatus, increase a flexibility of the apparatus, and reduce the manufacturing cost. Also, since restriction is reduced due to various shapes, the dummy terminal 100 can be implemented to have various sizes and shapes, and it is possible to realize an innovative design of a portable terminal.

FIG. 3 is a block diagram of the main body 300 cooperating with the dummy terminal 100, according to an embodiment of the present invention.

As illustrated in FIG. 3, the main body 300 includes a communication unit 310, a control unit 320, and the input unit 330.

The communication unit 310 transmits at least one of video information and audio information to the dummy terminal 100 through a short-distance wireless communication, and receives speech and/or image information, obtained by the speaker unit 140 and/or the camera unit 160, from the dummy terminal 100. Also, the communication unit 310 may additionally receive control information including specification information of the display unit 130 and the speaker unit 140 and user input information.

The control unit 320 reproduces video information and audio information on the basis of predetermined settings or received specification information of the dummy terminal 100, and transmits the video information and the audio information to the dummy terminal 100 through the communication unit 310.

In another embodiment, the control unit 320 of the main body 300 changes a resolution of at least one of video information and audio information in proportion to a short-distance wireless communication speed. The main body 300 measures the short-distance wireless communication speed or receives speed information from the dummy terminal 100 to determine a short-distance wireless communication transmission speed between the main body 300 and the dummy terminal 100, and determines a resolution of each of video information and the audio information which are transmitted to the dummy terminal 100 at a transmission speed.

For example, a resolution of video information may be a low resolution, a medium resolution, a high resolution, or a super-high resolution. When the short-distance wireless communication speed is 15 Mbps or more, the control unit 320 may change a resolution to a super-high resolution. When the short-distance wireless communication speed is 10 Mbps to 15 Mbps, the control unit 320 may change a resolution to a high resolution. When the short-distance wireless communication speed is 5 Mbps to 10 Mbps, the control unit 320 may change a resolution to a medium resolution. When the short-distance wireless communication speed is 1 Mbps to 5 Mbps, the control unit 320 may change a resolution to a low resolution.

Moreover, for example, a resolution of audio information may be a low resolution, a medium resolution, a high resolution, or a super-high resolution. When the short-distance wireless communication speed is 15 Mbps or more, the control unit 320 may change a resolution to a super-high resolution. When the short-distance wireless communication speed is 10 Mbps to 15 Mbps, the control unit 320 may change a resolution to a high resolution. When the short-distance wireless communication speed is 5 Mbps to 10 Mbps, the control unit 320 may change a resolution to a medium resolution. When the short-distance wireless communication speed is 1 Mbps to 5 Mbps, the control unit 320 may change a resolution to a low resolution.

In another embodiment, the control unit 320 of the main body 300 changes a bit transmission rate of at least one of video information and audio information in proportion to the short-distance wireless communication speed.

For example, a bit transmission rate of video information may be standard (a low resolution), 480 P, 720 P, or 1080 P. When the short-distance wireless communication speed is 15 Mbps or more, the control unit 320 may change the bit transmission rate to 1080 P. When the short-distance wireless communication speed is 10 Mbps to 15 Mbps, the control unit 320 may change the bit transmission rate to 720 P. When the short-distance wireless communication speed is 5 Mbps to 10 Mbps, the control unit 320 may change the bit transmission rate to 480 P. When the short-distance wireless communication speed is 1 Mbps to 5 Mbps, the control unit 320 may change the bit transmission rate to standard.

Moreover, for example, a bit transmission rate of audio information may be 320 kbps (CD quality), 192 kbps (digital audio quality), 128 kbps (base quality), or 96 kbps (FM quality). When the short-distance wireless communication speed is 15 Mbps or more, the control unit 320 may change the bit transmission rate to 320 kbps. When the short-distance wireless communication speed is 10 Mbps to 15 Mbps, the control unit 320 may change the bit transmission rate to 192 kbps. When the short-distance wireless communication speed is 5 Mbps to 10 Mbps, the control unit 320 may change the bit transmission rate to 128 kbps. When the short-distance wireless communication speed is 1 Mbps to 5 Mbps, the control unit 320 may change the bit transmission rate to 96 kbps.

Moreover, the control unit 320 may change the number of frames of video information which is transmitted in proportion to the short-distance wireless communication speed.

For example, the number of frames of video information may be 30 frames, 24 frames, 18 frames, or 12 frames per second. When the short-distance wireless communication speed is 15 Mbps or more, the control unit 320 may change the number of frames to 30 frames. When the short-distance wireless communication speed is 10 Mbps to 15 Mbps, the control unit 320 may change the number of frames to 24 frames. When the short-distance wireless communication speed is 5 Mbps to 10 Mbps, the control unit 320 may change the number of frames to 18 frames. When the short-distance wireless communication speed is 1 Mbps to 5 Mbps, the control unit 320 may change the number of frames to 12 frames.

Therefore, as a wireless transmission speed becomes higher, the dummy terminal 100 presents high-definition and high-sound-quality content, and even though the wireless transmission speed is low, video/audio information may be constantly presented at lower quality.

—Trace Signal Generation—

The input unit 330 receives a dummy terminal trace input from the user. The input unit 330 may include one or more buttons, and may be configured to receive a trace input and a control input for power-on/off by using one button.

When the control unit 320 obtains the dummy terminal trace input through the input unit 330, the control unit 320 transmits the trace signal to the dummy terminal 100 through the communication unit 310. When the dummy terminal 100 receives the trace signal, as described above, the position notification unit 170 of the dummy terminal 100 notifies its own position through vibration, alarm sound, or flickering.

The main body 300 may include a mobile communication function. The main body 300 may receive video call information or voice call information of the other party over the mobile communication network to generate a video/audio signal suitable for the specification of the dummy terminal 100, and transmit the video/audio signal to the dummy terminal 100. The main body 300 may transmit speech information or a video, received from the dummy terminal 100, to the other party or an external server over the mobile communication network.

Moreover, although not shown, the main body 300 may further include a storage unit that stores and executes various applications like smartphones, and stores various pieces of user information such as a telephone book, messages, conversation details, and a video/audio file.

Figure 4:
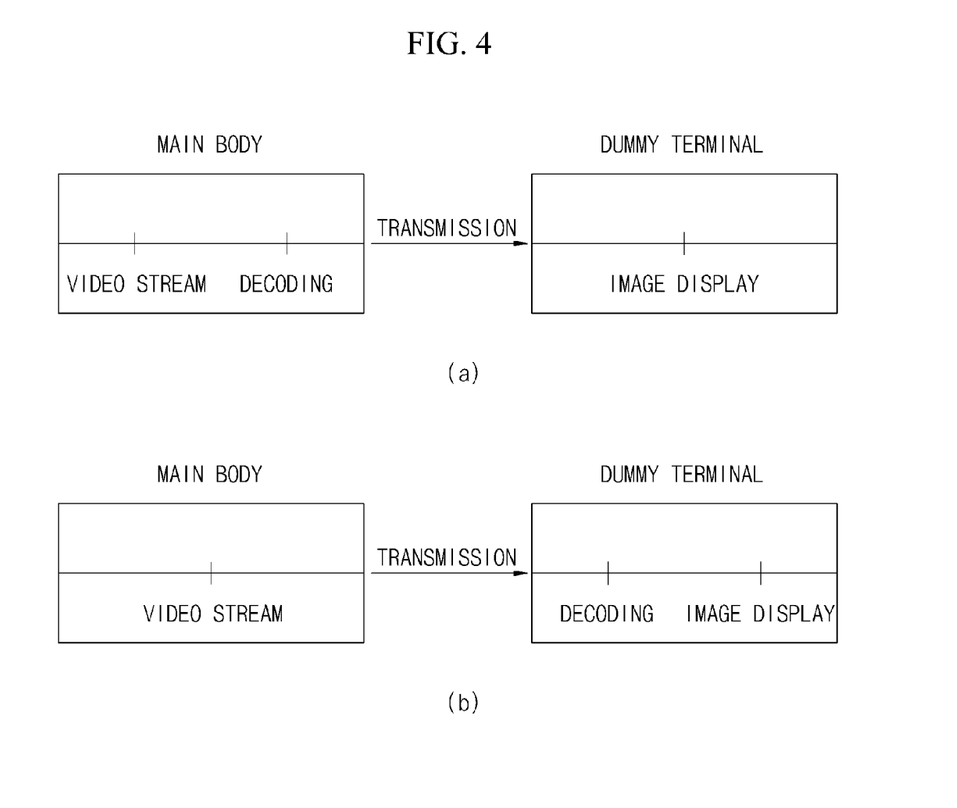
FIG. 4 is a diagram illustrating operations respectively performed by a main body and a dummy terminal when outputting video/audio information, according to an embodiment of the present invention.

FIG. 4 is a diagram illustrating a function performed by the main body 300 and the dummy terminal 100 in order for the dummy terminal 100 to output video/audio information received from the main body 300.

As illustrated in FIG. 4, there may be two cases.

In case 1, the main body 300 decodes a video/audio stream or a video/audio file, produces a video/audio signal, and transmits the video/audio signal to the dummy terminal 100.

The dummy terminal 100 receives the video/audio signal, and outputs the video/audio signal through the display unit 130 and/or the speaker unit 140.

In case 2, the main body 300 transmits a video/audio stream or file to the dummy terminal 100, and the dummy terminal 100 decodes the video/audio stream or file to generate a video/audio signal, and outputs the video/audio signal through the display unit 130 and/or the speaker unit 140.

That is, in case 1, the main body 300 performs all operations from a decoding operation to an operation of generating a display driver driving signal and a speaker driver driving signal, and the dummy terminal 100 performs only a function (screen display and/or voice output) of the simplest UI apparatus. Therefore, a structure of the dummy terminal 100 can be more simplified, and the dummy terminal 100 can be manufactured at low cost.

In case 2, the dummy terminal 100 reproduces (decoding and video/audio signal generation) a video/audio stream or file, and a structure of the dummy terminal 100 becomes complicated. However, case 2 is more suitable for an operation, in which a plurality of dummy terminals 100 which have the different specifications simultaneously display the same video/audio information according to the specification of each dummy terminal, than case 1.

That is, when a user wants to replay same content with a plurality of different dummy terminals, in case 1, a complexity of reproduction load and signal transfer of the main body 300 increases because the main body 300 generates a plurality of video/audio signals suitable for the specifications of the plurality of different dummy terminals and transmits each of the video/audio signals to a corresponding dummy terminal, but in case 2, since each dummy terminal reproduces/converts and outputs video/audio signal according to the specifications of its own display unit and speaker unit, the main body 300 merely broadcasts the same video/audio information.

In case 2, since the control unit 150 of the dummy terminal 100 reproduces video/audio signal, the control unit 150 changes video information to be suitable for a resolution of the display unit 130 and/or changes audio information to be suitable for a resolution of the speaker unit 140, changes at least one of a resolution of the display unit 130 and a resolution of the speaker unit 140 on the basis of the short-distance wireless communication speed with the main body 300, changes a bit transmission rate of video/audio information according to the short-distance wireless communication speed, or changes the number of frames of video information.

Therefore, in the present specification, video information and audio information transmitted or received between the dummy terminal 100 and the main body 300 include a video/audio file, a video/audio stream, an image driving signal input from a display driver that controls and drives each cell of the display unit 130, and a driving signal input to a speaker driver of the speaker unit 140.

Figure 5:
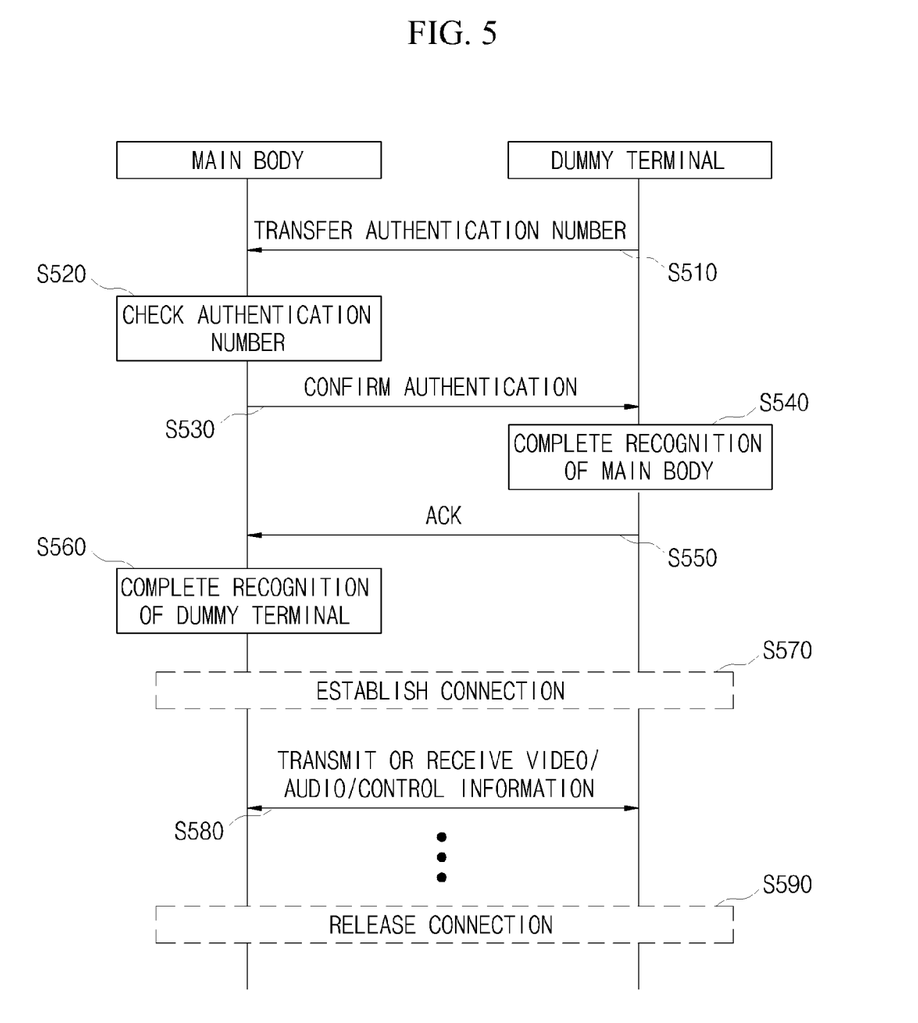
FIG. 5 is a diagram illustrating a process of performing authentication between a dummy terminal and a main body, according to an embodiment of the present invention.

FIG. 5 is a diagram illustrating a process of performing authentication between the dummy terminal 100 and the main body 300, according to an embodiment of the present invention.

First, the dummy terminal 100 is in the sleep mode, and then, the control unit 150 is activated by a user input such as the home button being pushed by the user. When the control unit 150 receives an authentication number from the user through a keypad or a security pattern input screen displayed by the display unit 130, the control unit activates the communication unit 120, and transfers the authentication number to the main body 300 in step S510.

The authentication number is an authentication number that is stored in the main body 300 in a manufacturing process and is recognized by the user by using a separate means such as a manual. That is, an authentication number is not built into the dummy terminal 100, and whenever a connection is established, the dummy terminal 100 receives an authentication number recognizable by the main body 300 through a user input, and transfers the received authentication number to the main body 300.

The transfer of an authentication number is performed according to a data transmission scheme between terminals within an intercommunication area by using Bluetooth or the other short-distance communication scheme.

The main body 300 checks the received authentication number in step S520, and when the received authentication number matches an authentication number stored in the main body 300, the main body 300 transmits an authentication check signal to the dummy terminal 100 in step S530.

When the dummy terminal 100 receives the authentication check signal, the dummy terminal 100 recognizes that a main body capable of communication is disposed near the dummy terminal 100 in step S540, and transmits an acknowledgement signal to the main body 300 in step S550.

When the main body 300 receives the acknowledgement signal from the dummy terminal 100, the main body 300 recognizes that there is a dummy terminal recognizing the main body 300 in step S560, and a short-distance communication connection is established between the main body 300 and the dummy terminal 100 in step S570.

When a communication connection is established, the main body 300 transmits or receives video/audio/control information to or from the dummy terminal 100 in step S580. When information is not transmitted or received for a predetermined time or more or a connection release request is transferred from one side, a connection is released in step S590, and the dummy terminal 100 enters the sleep mode.

When the user merely inputs an initial security letter/number or a security pattern like using a general smartphone, the user may be connected to an arbitrary main body 300 knowing an authentication number through the dummy terminal 100, and may use various functions.

On the other hand, in the above-described embodiment, security is provided at a level equal to the existing smartphone, but when a person that stoles or picks up the dummy terminal 100 knows an authentication number stored in the main body 300, there is a risk in which a thief or a finder uses the stolen or picked-up dummy terminal 100 by connecting the dummy terminal 100 to its own main body.

Therefore, in another embodiment for solving such a problem, the dummy terminal 100 stores a unique identification number of the body 300 which may be connected to the dummy terminal 100. In a process where the main body 300 transmits the authentication check signal (S530), the main body 300 adds the unique identification number of the main body 300 to the authentication check signal and transmits the authentication check signal. The dummy terminal 100 determines whether the unique identification number included in the authentication check signal (S540) matches the stored unique identification number of the main body 300, and only when there is a match therebetween, the dummy terminal 100 determines that a normal main body 300 is disposed near the dummy terminal 100, and transmits the acknowledgement signal (S550).

In this case, even though the dummy terminal 100 is stolen, unless the stored unique identification number of the main body 300 is hacked, it is impossible to connect the dummy terminal 100 to another main body, thereby fundamentally decreasing a possibility of being stolen.

In storing the unique identification number of the main body 300 in the dummy terminal 100, the unique identification number may be stored in a memory area, to which a user is inaccessible, in a manufacturing process in regard to security. However, for convenience of use, the unique identification number may be stored by a user input using a dedicated application (App).

Figure 6:
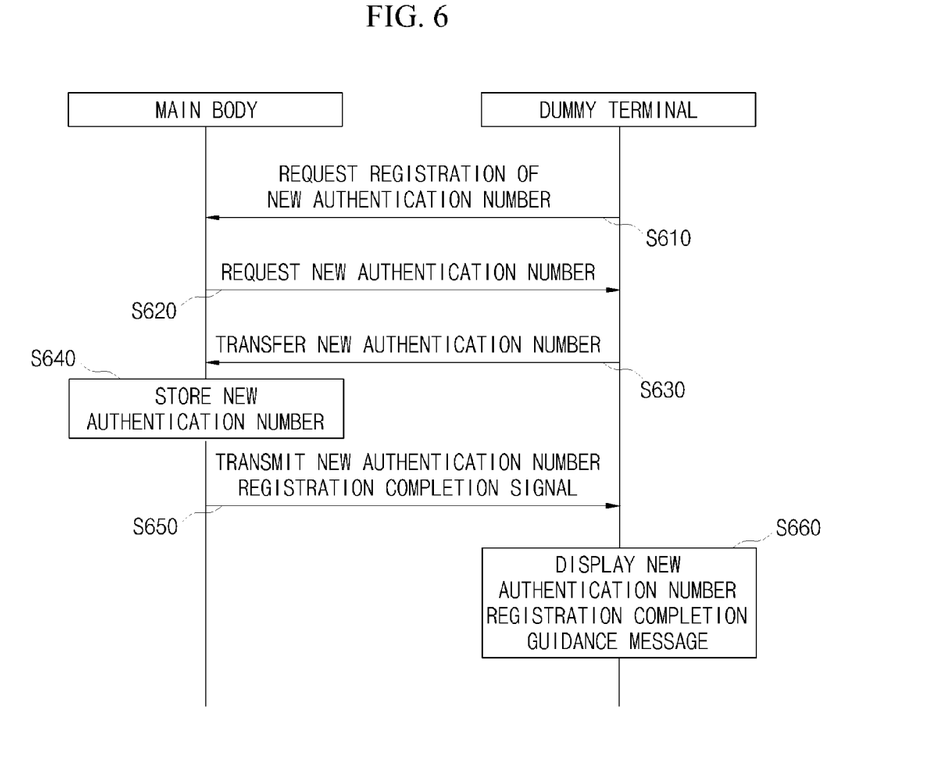
FIG. 6 is a diagram illustrating a process of registering a new authentication number, according to an embodiment of the present invention.

FIG. 6 is a diagram illustrating a process of registering a new authentication number, according to an embodiment of the present invention.

When the dummy terminal 100 and the main body 300 are connected to each other and then registration of a new authentication number is requested in step S610, the main body 300 requests the new authentication number from the dummy terminal 100 in step S620.

When the new authentication number is transferred to the dummy terminal 100 in step S630, the main body 300 stores the new authentication number in step S640, and transmits a new authentication number registration completion signal in step S650.

When the dummy terminal 100 receives the new authentication number registration completion signal, the dummy terminal 100 displays a new authentication number registration completion message in the display unit 130, and thus enables the user to know that the new authentication number is normally registered.

Registration of the new authentication number may be performed by a dedicated application which is built into the dummy terminal 100 and executed. The new authentication number may be input from the user through a keypad or a security patter input screen which is displayed in the display unit 130 of the dummy terminal 100.

Hereinabove, the essential elements and operation methods of the dummy terminal 100 and the main body 300 have been described. A use aspect of the dummy terminal 100 and the main body 300 according to an embodiment of the present invention is as follows.

Since the main body 300 does not include the UI function, it is not required for the main body 300 to include an element such as a display panel, and thus, the main body 300 may be variously manufactured in a circular shape, a square shape, a thin straight line shape, a curved shape, or the like. Also, a size of the main body 300 can be considerably reduced in comparison with portable terminals.

Even in keeping or carrying, the main body 300 may be variously implemented in a portable type which is held in a pocket or a bag, a body-attachable type such as a necklace, a bracelet, a ring, a watch, or a belt ornament, or a furnishable type or a restable type which is furnished on a table or a shelf.

The main body 300 has a remote communication function, and thus may relay an operation in which the user accesses the outside by using the dummy terminal 100. A portable main body have a mobile communication function is preferable, but a fixed main body may be provided within the technical spirit and scope of the present invention, in which case the fixed main body may relay access to the outside over a wired network.

That is, when the main body 300 is a general portable or attachable electronic device including the UI function or the dummy terminal 100 is an electronic device having another function instead of the UI function, this is within the technical spirit and scope of the present invention. Unless there is a separate detailed limitation, in the present specification, each of the main body 300 and the dummy terminal 200 may mean an electronic device that performs a multimedia reproduction or display function.

For example, a set-top box, a smart TV, or a home networking hub in a home, a personal computer (PC) of an office, or a general-use or the other-purpose device may act as a main body and may be connected to a dummy terminal. A dedicated fixed main body may be disposed at an office or the other place, and may be connected to the dummy terminal.

When user information (an address list, a schedule, a memo, etc.) is stored in a remote server or a plurality of main bodies having various shapes based on cloud computing, a user may carry only a dummy terminal without carrying a main body, and use all functions of a portable terminal such as a conventional smartphone.

In detail, a user may use a smartphone function in a mainly-used space by using a dedicated main body or the other-purpose device which is disposed in a home or an office. The user may access a cloud server through a general-use AP at a place such as a coffee shop, a subway station, an airport, or the like, use an application, read an address list or the like, and perform an Internet-based call.

Moreover, the dummy terminal 100 may generally be a hand-held terminal, or may be an attachable terminal.

For example, the dummy terminal 100 may be used as an attachable terminal by replacing an in-vehicle display unit. In this case, in-vehicle connectivity is efficiently implemented at low cost, and the implementation cost of an in-vehicle AVN or infortainment system can be considerably reduced.

That is, in the 2010s, smart cars including a smartphone function are attracting much attention, and there is an attempt to introduce a fixed smartphone into a vehicle as-is. However, due to the introduction, the price of a vehicle inevitably increases, and a user uses an excessive computing resource at high cost in a state where a redundancy of hardware such as a processor or a memory, like a portable smartphone and an in-vehicle smart device which has the substantially same function, is large. Also, user data synchronization between devices can be needed. However, if the dummy terminal 100 according to an embodiment of the present invention is equipped in a vehicle, and is connected to the main body 300, it performs most of a function of an in-vehicle AVN or infortainment system. Accordingly, a redundancy of a computing resource is reduced, the computing resource is efficiently used, a problem of synchronizing user data is solved, and the cost of using a smart device is reduced.

According to the embodiments of the present invention, in the portable terminal, the main body that performs an essential basic function is detached from the dummy terminal that performs only a UI function, the main body can be attached to a human body or be disposed at a safe place such as a bag or the like, and the dummy terminal is used like a smartphone or a tablet PC. Accordingly, the possibility of losing an expensive main body is reduced, and important personal data can be managed more securely.

Moreover, a video and a music which are reproduced by the main body are reproduced by one or more the dummy terminals having only the UI function, and thus, an efficiency of resource use increases in mirroring between apparatuses.

Moreover, a plurality of users can simultaneously enjoy a video and a music, which are produced by one the main body, through a plurality of the dummy terminals such as a smartphone or a tablet PC, and can perform a voice call and a video call.

Moreover, the main body receives use information from the dummy terminal, adjusts video information and audio information to be optimized for the specification of the dummy terminal, and transmits the adjusted video information and audio information to the dummy terminal. Therefore, a user receives the video information and audio information optimized for the dummy terminal, and thus, the user's convenience can be enhanced.

Moreover, in regard to the product cost, the main body is a high-cost product having a high specification, and the dummy terminal is a low-specification product that simply receives and outputs a reproduced signal. Accordingly, even when the dummy terminal is damaged or lost, an economic burden for repurchase is reduced.

Moreover, the main body transmits a trace signal to the dummy terminal, and the dummy terminal receives the trace signal and responds to the trace signal. Accordingly, even when the dummy terminal is lost, the dummy terminal can be easily purchased, and thus, a user's convenience can be enhanced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A portable dummy terminal capable of communicating with a main body through short-distance wireless communication protocol comprising:
    a microphone unit configured to obtain speech information from a user;
    a short-distance communication unit configured to receive at least one of video information and audio information from the main body, and transmit the speech information obtained by the microphone unit to the main body;
    a display unit configured to output the received video information;
    a speaker unit configured to output the received audio information; and
    a control unit configured to perform authentication with the main body and control an operation mode,
    wherein the portable dummy performs a user interface function whereas the main body performs portable terminal functions except for the user interface function.

2. The dummy terminal of claim 1, wherein,
    when the short-distance wireless communication with the main body is disconnected, the control unit enters a sleep mode,
    when a suitable authentication check signal is received from the main body in the sleep mode, the control unit enters an active mode in which the microphone unit, the display unit, and the speaker unit are activated,
    when a short-distance wireless communication speed is less than a predetermined threshold value, the control unit switches a current mode to a monitoring mode in which only the control unit and the communication unit are activated, and
    when the short-distance wireless communication speed is equal to or greater than the predetermined threshold value in the monitoring mode, the control unit enters the active mode.

3. The dummy terminal of claim 1, wherein the control unit comprises an unchangeable storage area configured to a unique identification (ID) of the main body.

4. The dummy terminal of claim 1, wherein when specification information of at least one of the display unit and the speaker unit is transmitted to the main body through the communication unit, and the main body transmits video information and/or audio information suitable for the specification information, the control unit receives the video information and/or the audio information to output the video information and/or the audio information to the display unit and/or the speaker unit.

5. The dummy terminal of claim 1, wherein the control unit changes a bit transmission rate of the speech information, based on a short-distance wireless communication speed with the main body.

6. The dummy terminal of claim 1, further comprising a position notification unit configured to, when a trace signal is received from the main body through the communication unit, generate at least one of a vibration signal, a trace signal sound, and a flickering signal in response to the trace signal.

7. The dummy terminal of claim 1, further comprising a camera unit, wherein the control unit transmits imaging data, photographed by the camera unit, to the main body through the communication unit.

8. The dummy terminal of claim 1, wherein the dummy terminal receives decoded video/audio stream from the main body and outputs the received signal at the display unit and/or the speaker unit.

9. The dummy terminal of claim 1, wherein the dummy terminal receives video/audio stream from the main body, decodes the video/audio stream, and output the decoded video/audio stream at the display unit and/or the speaker unit.

10. A main body which cooperates with a portable dummy terminal using short-distance wireless communication protocol, the main body comprising:
    a short-distance communication unit configured to transmit at least one of video information and audio information to the dummy terminal and receive at least one of speech information and control information from the dummy terminal through the short-distance wireless communication; and
    a control unit configured to transmit one of video information and audio information, having a type suitable for received specification information, to the dummy terminal through the short-distance communication unit and perform authentication based on an authentication number received from the dummy terminal to transmit an authentication check signal to the dummy terminal,
    wherein the portable dummy terminal performs a user interface function whereas the main body performs portable terminal functions except for the user interface function.

11. The main body of claim 10, wherein the control unit changes a resolution of at least one of the video information and the audio information, based on specification information of at least one of a display unit and a speaker unit of the dummy terminal.

12. The main body of claim 10, wherein the control unit changes a bit transmission rate or a transmission frame number of at least one of the video information and the audio information transmitted according to a short-distance wireless communication speed.

13. A method for authentication between a main body and a portable dummy terminal communicating through short-distance wireless communication protocol, the method comprising;
    receiving an authentication number, recognized by the main body, from the dummy terminal;
    checking whether the authentication number is suitable, and when the authentication number is suitable, transmitting an authentication check signal to the dummy terminal;
    after a main body recognition completion operation performed by the dummy terminal, receiving the authentication check signal from the dummy terminal; and
    recognizing the dummy terminal, which has transmitted the authentication check signal, to connect a short-distance communication channel with the dummy terminal,
    wherein the portable dummy terminal performs a user interface function only whereas the main body performs portable terminal functions except for the user interface function.

14. The method of claim 13, wherein the transmitting of an authentication check signal comprises adding a unique identification number of the main body, stored in the main body, to the authentication check signal and transmitting the authentication check signal along with the unique identification number.

15. The method of claim 14, wherein the unique identification number is stored only in the main body while the main body is manufactured.

16. The method of claim 13, further comprising activating the dummy terminal in a sleep mode by pressing a home button prior to the receiving an authentication number.

17. The method of claim 13, further comprising disconnecting the short-distance communication channel when there is no communication between the main body and the dummy terminal or a disconnect request by one of the main body and the dummy terminal.

18. The method of claim 13, further comprising renewing the authentication number between the main body and the dummy terminal after the main body and the dummy terminal is connected to each other.

19. The method of claim 18, wherein the renewing the authentication number comprises:
    requesting registration of a new authentication number by the dummy terminal;
    requesting the new authentication number by the main body;
    transferring the new authentication number by the dummy terminal;
    storing the new authentication number at the main body; and
    transmitting a new authentication number registration completion sign to the dummy terminal from the main body.

20. The method of claim 19, further comprising displaying a new authentication number registration completion guidance message at the dummy terminal after the transmitting a new authentication number registration completion sign.

* * * * *